Oct. 18, 1932.   L. E. GREINER, JR   1,883,717
CLINICAL THERMOMETER
Original Filed July 30, 1928

Inventor
Leopold E. Greiner Jr.
by his Attorney

Patented Oct. 18, 1932

1,883,717

UNITED STATES PATENT OFFICE

LEOPOLD E. GREINER, JR., OF NEW YORK, N. Y.

CLINICAL THERMOMETER

Original application filed July 30, 1928, Serial No. 296,152. Divided and this application filed October 5, 1929. Serial No. 397,477.

This invention relates to thermometers, particularly to the clinical and chemical type of thermometer, the object of the invention being to improve this class of thermometers thereby to facilitate the reading thereof, the present application being a division of my application bearing Serial No. 296,152 and filed July 30, 1928.

Clinical thermometers are provided with a very restricted bore for the thread-like passage of the mercury in its column, which is difficult for even skilled persons to accurately read, especially in a poor light, and consequently mistakes are frequently made in the reading thereof. Various attempts have been made to overcome this objectionable feature, but, owing to the small size of the instrument, this difficulty has not been entirely eliminated, even though it has been the general practice to provide such thermometers with a magnifier.

Therefore, it is the object of the present improvement to provide a thermometer of the class described so constructed as to facilitate the reading thereof and as far as possible prevent mistakes in such reading, and to do this in a simple, inexpensive and practical manner which will not interfere with the commercial production or sale of the article.

In the drawing accompanying and forming part of this specification—

Similar characters of reference indicate corresponding parts in the several views.

Figure 1:
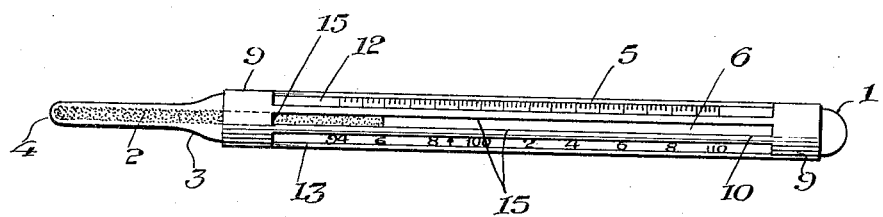
Figure 1 is a view of one form of this improved thermometer.

Before explaining in detail the present improvement and mode of operation thereof, I desire to have it understood that the invention is not limited to the details of construction and arrangements of parts which are illustrated in the accompanying drawing, since the invention is capable of other embodiments, and that the phraseology which I employ is for the purpose of description and not of limitation.

The thermometer, in a general way, comprises a stem 1 of glass having a mercury bore or passage 2 and the usual constricted portion 3 communicating with the mercury bulb 4. The thermometer is provided with the usual degree marking 5 which may be applied in any suitable way. In the present form of the invention I provide a shield 9 made of some suitable light-weight material, such as celluloid or aluminum, and which may be transparent, if desired, and shaped to conform to the shape of the thermometer, but provided with a slot 10 of just sufficient size to permit the prismatic or magnifying portion of the thermometer to be in view. This shield is also slotted, as at 11, thereby to insure that it will resiliently clamp onto the thermometer and also to permit the proper expansion thereof. The shield is of the proper length to enclose the reading part of the thermometer.

In the form of the invention shown, in addition to the slot 10 through which the mercury may be observed and the expansion slot 11, the shield may also have slots or openings 12 and 13 at opposite sides, this particular form of shield being adapted for that class of thermometers where the scale is on one side and the temperature degree markings are on the opposite side.

When the thermometer is of that type having all the markings on one side, the shield will be provided with an opening only at one side.

Figure 2:
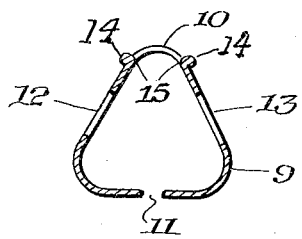
Fig. 2 is a cross-sectional view of the shield.

As shown in Fig. 2, the edges of the slotted portion through which the mercury may be observed are curled or rolled, as at 14, to provide a reinforcing and protected edge. This shield may be readily slipped over the thermometer, and not only acts as a protection to prevent breakage but may also act as a casing therefor; in fact, it may be made as a part of the screw cap or casing so as to enclose the entire thermometer, if desired. The edges of the slot along the casing are colored, in contarst with the natural color of the material used for the casing, as at 15, preferably red, and the transverse edges of this shield at the ends of the slot may also be colored, thereby very materially facilitating the reading of the thermometer and preventing misreading thereof, even in a poor light.

In practice the degree marks may be applied directly to the shield instead of to the glass of the thermometer, in which case, of course, it will be necessary that the shield have a fixed position relatively to the thermometer.

From the foregoing it will be observed that the magnifying portion of the thermometer is very clearly defined by the colored border lines at the opposite sides and ends of this magnifying portion of the thermometer, thereby materially facilitating the proper reading thereof.

It is to be understood by describing in detail herein any particular form, structure or arrangement, that it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A thermometer of the class described having a shield covering and protecting the thermometer and having a longitudinal slot aligned with the prismatic or magnifying portion of the thermometer and also having a longitudinal slot along its side for the observation of the degree markings.

2. A thermometer of the class described having a shield covering and protecting the thermometer and having a longitudinal slot aligned with the prismatic or magnifying portion of the thermometer and also having a longitudinal slot along its side for the observation of the degree markings, said shield being split to render the same resilient and expansible.

3. A thermometer of the class described having a shield covering and protecting the thermometer and having a longitudinal slot aligned with the prismatic or magnifying portion of the thermometer and also having a longitudinal slot along its side for the observation of the degree markings, said shield having reinforced edges along the edges of the longitudinal slot aligned with the prismatic or magnifying portion of the thermometer.

4. A thermometer of the class described having a shield covering and protecting the thermometer and having a longitudinal slot aligned with the prismatic or magnifying portion of the thermometer and also having a longitudinal slot along its side for the observation of the degree markings, said shield having curled or bent edges along the edges of the longitudinal slot aligned with the prismatic portion of the thermometer.

5. A thermometer of the class described having a shield covering and protecting the thermometer and having a longitudinal slot aligned with the prismatic or magnifying portion of the thermometer and also having a longitudinal slot along its side for the observation of the degree markings, said shield having edges of said first longitudinal slot colored in contrast with the remainder of the shield.

6. A thermometer of the class described having a shield covering and protecting the thermometer and having a longitudinal slot aligned with the prismatic or magnifying portion of the thermometer and also having a longitudinal slot along its side for the observation of the degree markings, said shield having edges of said first longitudinal slot reinforced and colored in contrast with the remainder of the shield.

7. A thermometer of the class described having a shield covering and protecting the thermometer and having a longitudinal slot aligned with the prismatic or magnifying portion of the thermometer and also having a longitudinal slot along its side for the observation of the degree markings, said shield having curled or bent edges along the edges of said first longitudinal slot and colored in contrast with the remainder of the shield.

8. A thermometer of the class described having a shield covering and protecting the thermometer and having a longitudinal slot aligned with the prismatic or magnifying portion of the thermometer and also having a longitudinal slot along its side for the observation of the degree markings, said shield having curled or bent edges along the edges of said first longitudinal slot, all of the edges of said slot colored in contrast to the remainder of the shield.

9. A thermometer of the class described having a shield covering and protecting the thermometer and having a longitudinal slot aligned with the prismatic or magnifying portion of the thermometer and also having a longitudinal slot at each side of said first longitudinal slot.

10. A thermometer of the class described having a shield covering and protecting the thermometer and having a longitudinal slot aligned with the prismatic or magnifying portion of the thermometer and also having a longitudinal slot at each side of said first longitudinal slot, said first longitudinal slot having reinforced edges along the parallel edges of said longitudinal slot.

11. A thermometer of the class described having a shield covering and protecting the thermometer and having a longitudinal slot aligned with the prismatic or magnifying portion of the thermometer and also having a longitudinal slot at each side of said first longitudinal slot, said first longitudinal slot having all the edges thereof colored in contrast with the remainder of the shield.

Signed at New York, N. Y., this 30th day of September, 1929.

LEOPOLD E. GREINER, Jr.